April 24, 1962 E. SCHNITZER 3,031,181
BAND PASS SHOCK ABSORBER
Original Filed Sept. 30, 1957
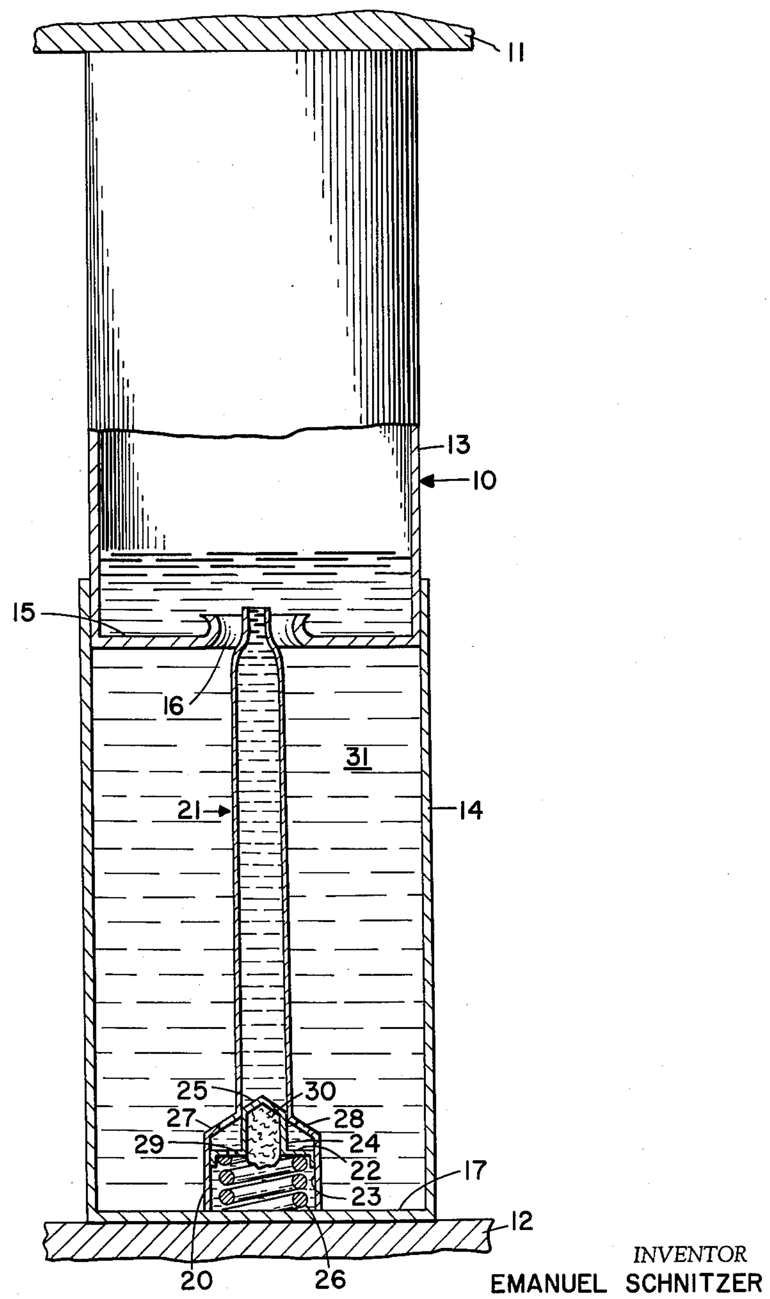
INVENTOR
EMANUEL SCHNITZER
BY
G. D. O'Brien
J. O. Tresansky
ATTORNEYS United States Patent Office 3,031,181
Patented Apr. 24, 1962

3,031,181

BAND PASS SHOCK ABSORBER

Emanuel Schnitzer, 926 19th St., Newport News, Va.

Original application Sept. 30, 1957, Ser. No. 687,310, now Patent No. 2,928,670, dated Mar. 15, 1960. Divided and this application Mar. 7, 1960, Ser. No. 13,397
2 Claims. (Cl. 267—64)
(Granted under Title 35, U.S. Code (1952), sec. 266)

The invention described herein may be manufactured and used by or for the Government of the United States of America for governmental purposes without the payment of any royalties thereon or therefor.

This application is a division of my copending application Serial No. 687,310, filed September 30, 1957, issued March 15, 1960 as Patent No. 2,982,670, which in turn is a continuation-in-part of my copending application Serial No. 528,563, filed August 15, 1955, now Patent No. 2,866,633.

This invention relates to shock struts for machine elements and the like with particular application to shock absorbers including a piston slidable in a fluid containing cylinder. In conventional shock absorbers of this type, when the piston moves under compression in the cylinder, the fluid is forced through a small orifice in the piston, giving rise to a damping action which is roughly proportional to the square of the relative velocity of piston and cylinder. It is apparent, therefore, that the higher the disturbance frequency, or time rate of change of loading, the more resistance the absorber exhibits to relative motion until at high frequencies it is, in effect, a rigid link.

One of the primary objects of the invention is to filter out, in a shock absorber, loads from disturbances in certain frequency ranges or having certain rates of application while retaining the required load arresting characteristics of conventional shock absorbers in the remainder of the frequency spectrum.

An object, also, is to provide simplified and improved means for placing the primary object of the invention into effect.

Another object of the invention is to provide means for utilizing the metering pin of the piston in a conventional piston-cylinder type shock absorber, both as a control by telescoping displacement and as a load filtering device by virtue of its hollow construction permitting fluid flow therethrough.

Still another object is to provide a new and improved shock absorber sensitive not only to displacement of the coacting parts but to the frequency of the relative movement of the parts.

A further object is to provide an arrangement in shock absorbers in which parts may be removed, replaced or adjusted without the necessity of complete disassembly of the shock absorber strut.

Other objects and many of the attendant advantages of this invention will be readily appreciated as the same becomes better understood by reference to the following detailed description when considered in connection with the solitary FIGURE of the accompanying drawing wherein is shown a longitudinal sectional view of the shock absorber, with the metering pin fixed to the base of the absorber cylinder.

Referring now to the drawing, a shock absorber 10 is shown adapted for insertion between machine parts 11 and 12, which may be an airplane body and a supporting wheel. This shock absorber is of the plunger type including reciprocatable members 13 and 14 attached respectively to parts 11 and 12, the members 13 and 14, being for example, in the form of hollow cylinders, member 13 telescoping in member 14.

The lower or piston end of piston 13 is provided with an end plate 15, forming a closed surface except for the centrally positioned main orifice 16. This orifice is one member of a valve mechanism, as will be explained hereinafter, and to this end the orifice edge is curved axially to give a nozzle formation. The base or outer end of the absorber cylinder 14 is closed by a plate 17, and attached to this plate is a centrally disposed control cylinder 20, a plunger or pin 21 extending from the inner top end of the cylinder to and through the main orifice 16 in piston plate 15, but not contacting the orifice edge, so that there is a permanent minimum opening about the pin for fluid flow. It is to be understood that the exterior surface of the pin 21 may be contoured so as to vary the effective orifice area as a function of the telescoping position of the shock strut.

Both control cylinder and pin are hollow, and a function of the control cylinder is to actuate valve means controlling flow of absorber cylinder fluid through the pin into the absorber piston above plate 15. To accomplish this function, a flat annular disk 22 is provided; the disk having a depending edge skirt forming a sliding bearing surface on the inside of cylinder 20. Attached to the central opening edge of this disk is a projecting tube 24 terminating in a closed valve element 25 adapted to engage the circular inner edge of pin 21. A coil spring 26, mounted inside the control cylinder 20, with ends engaging the outer or lower absorber wall 17 and the valve disk 22, normally hold the valve element 24 in closed engagement with the pin end, thereby preventing flow therethrough. Connection between the top of control cylinder 20 and the outer or base end of pin 21 is made by a flared peripheral connecting section 27 provided with radial slots 28 thereabout for free fluid communication from the shock absorber cylinder 14 to the space about valve element 25. It is apparent that on opening of valve 25, fluid communication is established between the cylinder and piston through pin 21. A bleed orifice is formed in annular valve disc 22 and a non-saturable compressible material such as sponge rubber 30 with nonconnected air holes distributed therein is inserted either in valve tube 24 or somewhere in the control cylinder 20 between plates 22 and 17.

In the operation of the described shock absorber, it is assumed that the cylinder 14 is filled with a pressure transmitting fluid 31, such as oil, and the piston 13 is gas-filled, as with air. Preferably the liquid from cylinder 14 overflows into piston 13 to cover the main piston orifice 16, as shown in the drawing. Under the influence of compression applied axially to the strut, where there is a slow rate of increase of the pressure in the lower cylinder 14, the pressure, building up at a slow rate, forces liquid through the annular space in main orifice 16 around the outside tip of pin 21, thus compressing the air in piston 13 to absorb shock. The magnitude of the load will be controlled by the telescoped position or displacement of the strut. Also, fluid will be forced into the control cylinder 20 through the slots 28 at the base of the pin and thence through the bleed orifice 29 into the region below the valve element 25. Since the pressure increases slowly in cylinder 14, the bleed orifice does not present a serious restriction to fluid flow through the valve plunger. Consequently, the spring 26 will maintain the valve in its up or closed position while the volume of compressible material will become smaller as the fluid pressure increases below the valve element. Thus, this shock strut, for low rates of loading, will behave in a manner similar to a conventional aircraft shock strut with a metering pin.

For high rates of loading, the bleed orifice 29 will offer serious resistance to the transfer of fluid into the control cylinder 20 and, in consequence, the pressure difference above and below the valve disk 22 will cause it to move downwardly, opening valve element 25 to flow of liquid from the absorber cylinder 14, through control cylinder slots 28 and pin 21 and into the upper piston 13. Hence, for these higher loading rates, the load transmission is markedly reduced, the shock absorber being effective for load shock only for the lower predetermined rates of load application.

It will be apparent to those skilled in the art that damping control in the described shock absorber is secured through a mechanism sensitive not only to relative displacement of the absorber elements but also to the frequency or rate of application of the loads. Since the liquid flow through the pin will usually be much greater than that around it, for rapidly applied loads, the rate control will, as a general rule, far outweigh the displacement control, in alleviating load in this type of strut.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A shock absorber adapted for connection between two machine parts for damping loads of selected rates of application transmitted between said machine parts, comprising a hollow cylinder forming a receiver having a closed base end and adapted to contain a fluid, a hollow cylinder forming a piston having closed ends adapted to contain a gas and having telescopic connection with said receiver cylinder to reciprocate in said receiver cylinder, the closed piston end within said receiver cylinder having a main orifice therein, a control cylinder fixed internally to the base of said hollow receiver cylinder, a hollow plunger attached to said control cylinder for fluid communication with the interior thereof, said plunger having a free end positioned in said closed piston end main orifice, a valve slidably disposed within said control cylinder including a portion normally positioned to block fluid flow from said control cylinder into said hollow plunger and an apertured disk portion having an annular edge in sliding contact with the interior of the side wall of said control cylinder, said valve being movable upon the development of fluid pressure within said receiver at rates above the maximum rate of fluid flow through the apertured disk portion of said valve to permit fluid to flow from said control cylinder into said hollow plunger, a coil spring mounted in said control cylinder between said valve and said base of said hollow receiver cylinder, and a plurality of apertures formed along the wall area of the control cylinder to permit free flow of fluid therethrough.

2. A shock absorber adapted for connection between two machine parts, comprising a hollow cylinder partially filled with fluid forming a piston connectable to one part, a hollow fluid filled cylinder forming a receiver connectable to the other part, said piston having telescoping connection with said receiver, a piston head having a main orifice therein at the compression end of said piston, a hollow plunger attached to said receiver within the interior thereof, said plunger having a free end positioned in said orifice and a passage way to said receiver space at its attached end, and a valve interposed in the flow space between said passage way and plunger interior, said valve including control means comprising an apertured disk movable in a control cylinder upon the development of fluid pressure in said receiver at a rate above the maximum rate of fluid flow through said apertured disk for actuating said valve to permit fluid flow between said passage way and said plunger interior.

References Cited in the file of this patent

FOREIGN PATENTS 992,347 France ---------------- July 11, 1951